Patented Aug. 23, 1932

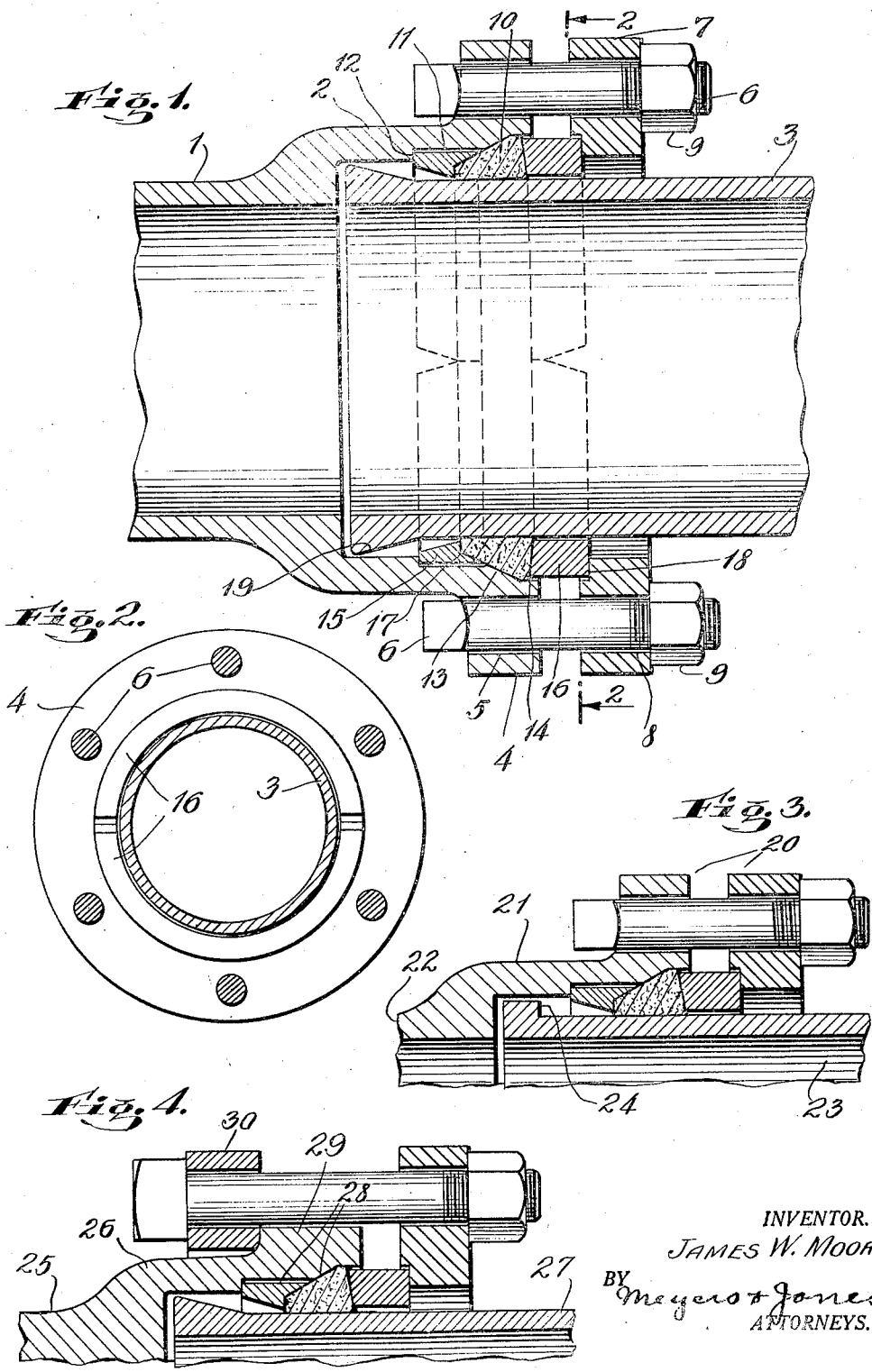

1,873,620

UNITED STATES PATENT OFFICE

JAMES W. MOORE, OF BIRMINGHAM, ALABAMA, ASSIGNOR TO AMERICAN CAST IRON PIPE COMPANY, OF BIRMINGHAM, ALABAMA, A CORPORATION OF GEORGIA

PIPE JOINT

Application filed October 17, 1929. Serial No. 400,272.

This invention is an improvement in pipe joints, and particularly in joints of the bell and spigot type, as used in connecting pipe sections which are usually of cast iron. The joint in pipes to which the present improvement relates is sealed by compressible packing, compressed between the bell and spigot parts by a gland which is tightened against the packing by bolts.

The principal object and advantage of the invention is the provision of means positively preventing separation of the pipe members at the joint while permitting limited but substantial relative longitudinal movement of the member to take care of expansion and contraction or other forces tending to move one of the pipe members in relation to the other, and at the same time maintaining the tightness and sealing effect of the packing.

In the usual construction of pipe joints of the character in question, the friction grip of the gasket or packing against the socket and spigot end surfaces of the pipes is relied upon to prevent endwise separation.

This arrangement provides a satisfactory seal, but not a positive lock against endwise separation of the pipes longitudinally.

One of the primary objects of the present invention is the provision of a lock for pipe joints of this character, wherein there is a positive locking engagement between the pipes to limit their longitudinal separating movement with respect to each other, and at the same time to permit slight endwise movement of the pipe members to take care of contraction and expansion while also maintaining the tightness and sealing effect of the packing.

Another object is the provision of a simple relatively inexpensive locking means requiring but slight change in the pipes themselves, and enabling the quick and easy assembling or disassembling of the pipe sections.

With these and other objects in view the invention consists in the construction and novel combination of parts fully described hereinafter, illustrated in the accompanying drawing, and pointed out in the claims appended hereto, it being understood that various changes in the form, proportion, size and minor details of construction within the scope of the claims, may be resorted to without departing from the spirit of the invention.

In the drawing forming a part hereof:—

Fig. 1 is a longitudinal section of the improved joint.

Fig. 2 is a section on the line 2—2 of Fig. 1.

Figs. 3 and 4 are details in section of alternate constructions.

In the embodiment of the invention shown in Figs. 1 and 2, one of the pipe sections 1 has the usual bell 2, and the other section 3 has the spigot end adapted to be received within the bell. The bell has a marginal flange 4, which is provided with openings 5, for receiving bolts 6.

A collar 7 is loosely placed about the section 3, and this collar has openings 8 corresponding in number, and adapted to register with the openings 5 of the flange. The bolts are passed through the registering openings, and are engaged by nuts 9, whereby the collar may be drawn toward the flange.

The packing includes a ring or gasket 10 of suitable compressing material, arranged between the spigot end of the bell. The outer end of the spigot is counter bored, reamed or cast enlarged, as shown at 11 and 14, to provide portions of unequal diameter, and an annular shoulder 12 at the inner end of the slightly enlarged cylindrical portion 11. Between the portions of unequal diameter the reamed portion is inclined as shown at 13, and the outer face of the packing ring is similarly inclined to cooperate therewith, to provide a wedging action when the packing is drawn toward the bell.

Rings 15 and 16 are arranged on opposite sides of the packing or gaskets, the said rings being sectional, each consisting of similar sections, and each section is substantially a half circle. The sectional form of the rings is for convenience in placing them on the pipe section 3, since the inner ring diameter is only slightly greater than that of the main diameter of the pipe, and the rings if in continuous circular form could not be passed over the spigot end enlargement such as 19 or 24. As shown in Fig. 1, the ring 15 abuts at one end the shoulder 12, and at the other the packing, and the said other end is counterbored or reamed as shown at 17, to fit the end of the packing, and a part of the inclined outer face thereof, the slant or conical face 17 of the ring 15 forms in effect a continuation of the similar surface 13 provided in the bell for contraction or compression of the packing against the spigot surface when compressed by tightening the bolts, whereby ring or collar 7 acts on the ring 16 to compress the packing, the inward end portion of which then abuts against the shoulder of ring 15 located in a vertical plane at the inward end of the conical surface 17. The inner end face of the ring 16 may be beveled or conical, as shown, to increase the effectiveness of compression of the packing. The outer end of the ring 16 engages in a ream or counterbore 18, in the inner face of the collar 7, to locate and center the collar, whose bore is of a size to pass over the enlargement of the spigot end, and also to retain the two halves of the ring 16 in position after they are located about the spigot portion 3.

The positive lock against separation of the pipe sections is provided for by an external annular bead, or conical enlargement 19, on the spigot end of the pipe section 3. This bead has an outer surface which flares from the surface of the section 3, and the internal surface of the ring 15 is shaped to correspond. It will be apparent that should the pipe section 3 be pulled away from the section 1, the surface 19 of the bead will engage the internal surface of the ring 15, to positively prevent further separation. Thus the packing of the gasket and associated parts cooperates with the bead to provide a positive lock.

At the same time location or spacing of the enlargement such as 19 or 24 in relation to the inwardly located ring 15 or stop ring is such as to permit substantial inward and outward movement of the spigot portion or pipe section 3, in relation to the bell or pipe section 1, under the influence of temperature changes, mechanical forces, etc., which without this joint slippage would tend to cause buckling or other disturbances or breakage in the pipe line; and during any such movements of the member 3 in relation to the other pipe member its cylindrical portion slides within the packing 10 and tightness of the packing and of the seal is maintained at all times. The conical packing-compressing surface 13 in the bell is important since this provides for the positive compression of the packing against the spigot member. The conical surface 17 of stop ring 15 also forms in effect a continuation of the bell surface 13 for the further compression of the inward portion of the packing against the spigot member. Thus in spite of movements of the one pipe member within the other, a positive seal is maintained at the surface of the spigot portion 3 and also between the packing and the bell at the surface 13.

In assembling the improved joint, the spigot end of the pipe section 3 may be inserted in the bell or socket of the section 1, after which the ring sections 15, the packing 10, and the ring sections 16 may be placed, the ring 7 having previously been slipped over the spigot end of the pipe section 3. It will be noted, referring to Fig. 1, that the internal diameter of the ring 7 is somewhat greater than the external diameter of the largest portion of the bead 19, to permit placement of this ring over the enlarged pipe end.

After the parts are assembled as described, the bolts are engaged with the nuts 9, and the nuts are turned to draw the collar toward the flange 4. Thus the packing 10 is compressed between the rings 15 and 16, axially of the pipe, and because of the cooperating inclined surfaces it expands radially of the sections.

In Fig. 3, the joint indicated generally at 20, is of the same character as that shown in Fig. 1, as is also the bell 21 of the pipe section 22. The other pipe section 23 has an external marginal rib 24, which acts in the same manner as the bead 19 in preventing separation of the sections, and the confronting face of ring 15 may in such case be made in the form of a squared shoulder to encounter the squared or radial face 24 of the bead. It will be apparent that this rib or bead 24 might be replaced by lugs or projections of any character, as for instance, the screws shown and described in my copending application Serial No. 400,271, of even date herewith.

In Fig. 4, the pipe section 25 corresponding to section 1 of Fig. 1, has the bell 26, while the end of the section 27 is the same as the end of the section 3. The packing indicated generally at 28, is precisely the same as that shown in Fig. 1. Instead of providing the bell end of the pipe with a marginal flange having openings, it is provided with a marginal flange 29 of less depth, and a collar 30 is arranged on the bell behind the flange 29. The construction is otherwise the same as that shown in Fig. 1, and operates in the same manner.

What is claimed as new is:—

1. A joint for sections of pipe of the bell and spigot type, comprising a flaring abutment on the interior of the bell section adjacent its end, a counterbore terminating forwardly at the inner end of the flaring abutment, a ring mounted in the counterbore around the spigot section, said ring having a flared face in substantially the same plane as said flaring abutment, a compressible packing between the outer surface of the spigot section and said flaring abutment on the bell section and flared face on the packing ring, a second counterbore located rearwardly of said first counterbore and terminating forwardly at the rear end of said first counterbore, a portion of the packing ring being disposed in front of said second counterbore, and an enlarged end on the spigot section located in said second counterbore.

2. The structure of claim 1 wherein the portion of the packing ring disposed in front of said second counterbore has a tapered surface and the enlarged end of the spigot section is tapered in substantially the same plane as the tapered surface on the packing ring.

3. A joint for sections of pipe of the bell and spigot type, the bell section having a tapering abutment formed adjacent its end, a counterbore terminating forwardly at the inner end of the tapering abutment, a ring mounted in said counterbore around the spigot section, the inner end of the ring abutting the shoulder of the counterbore and the outer end of the ring being formed with a tapered surface substantially aligned with said tapered abutment on the bell section, a shoulder on the ring at the inner end of said tapered surface, a compressible packing engaging the tapering abutment on the bell section and the tapered surface and the shoulder on said ring, and means for holding said packing in said position.

Signed at Birmingham, in the county of Jefferson and State of Alabama, this 5th day of October, A. D. 1929.

JAMES W. MOORE.